US012680937B2

(12) United States Patent
Jackson et al.

(10) Patent No.: US 12,680,937 B2
(45) Date of Patent: Jul. 14, 2026

(54) CAPTURE VESSEL CARTRIDGE FOR PERMEATION TESTING OF PREFILLED PACKAGES AND CONTAINERS

(71) Applicant: MOCON, INC., Minneapolis, MN (US)

(72) Inventors: Jeffrey L. Jackson, Lino Lakes, MN (US); Slava A. Berezovskiy, Apple Valley, MN (US); Timothy A. Ascheman, Elk River, MN (US)

( * ) Notice: Subject to any disclaimer, the term of this patent is extended or adjusted under 35 U.S.C. 154(b) by 379 days.

(21) Appl. No.: 18/536,460

(22) Filed: Dec. 12, 2023

(65) Prior Publication Data

US 2024/0192114 A1 Jun. 13, 2024

Related U.S. Application Data

(60) Provisional application No. 63/387,005, filed on Dec. 12, 2022.

(51) Int. Cl.
*G01N 15/08* (2006.01)

(52) U.S. Cl.
CPC ... *G01N 15/0806* (2013.01); *G01N 2015/086* (2013.01)

(58) Field of Classification Search
CPC .................... G01N 15/0806; G01N 2015/086
USPC ...... 73/38, 45.4, 49.2, 49.3, 863.81, 863.83, 73/864.81; 220/200, 241, 242, 260, 262, 220/284, 309.1, 310.1, 319, 320, 324
See application file for complete search history.

(56) References Cited

U.S. PATENT DOCUMENTS

| | | | |
|---|---|---|---|
| 3,248,930 A | 5/1966 | Speegle et al. |
| 3,348,395 A | 10/1967 | Orr, Jr. et al. |
| 3,494,175 A | 2/1970 | Cusick et al. |
| 3,590,634 A | 7/1971 | Pasternak et al. |
| 3,593,634 A | 7/1971 | Guntersweiler et al. |
| 3,618,361 A | 11/1971 | Stephens et al. |
| 3,729,983 A | 5/1973 | Coppens |
| 3,751,973 A | 8/1973 | Strauss et al. |
| 3,805,593 A | 4/1974 | Sandoz et al. |
| 3,805,594 A | 4/1974 | Hayashi |
| 3,850,040 A | 11/1974 | Orr, Jr. et al. |
| 4,292,839 A | 10/1981 | Hartness |
| 4,459,843 A | 7/1984 | Durham |
| 4,511,044 A | 4/1985 | Connor et al. |
| 4,747,298 A | 5/1988 | McDaniel |

(Continued)

FOREIGN PATENT DOCUMENTS

| | | | | |
|---|---|---|---|---|
| CN | 106979916 A | | 7/2017 | |
| CN | 111443023 A | * | 7/2020 | ......... G01N 15/0806 |

(Continued)

*Primary Examiner* — Robert R Raevis
(74) *Attorney, Agent, or Firm* — SHERRILL LAW OFFICES PLLC; Michael Sherrill

(57) ABSTRACT

A cartridge for use in conjunction with a target analyte permeation testing instrument and method for measuring transmission rate of a target analyte through a prefilled package or container using the cartridge. The cartridge includes an open ended vessel, a first end cap capable of repeated sealed engagement over one of the open axial ends of the vessel, a second end cap in sealed engagement over the other open axial end of the vessel, an entrance port for providing fluid communication from a source of carrier gas to the void volume of the vessel, and an exit port for providing fluid communication from the void volume of the vessel to a target analyte sensor.

9 Claims, 6 Drawing Sheets

(56)                    References Cited

U.S. PATENT DOCUMENTS

| | | | |
|---|---|---|---|
| 4,788,850 | A | 12/1988 | Buschor et al. |
| 4,852,415 | A | 8/1989 | Bogatzki et al. |
| 4,914,810 | A | 4/1990 | Zohler |
| 5,001,935 | A | 3/1991 | Tekkanat et al. |
| 5,029,463 | A | 7/1991 | Schvester et al. |
| 5,319,957 | A | 6/1994 | Stieger et al. |
| 5,373,729 | A | 12/1994 | Seigeot |
| 5,513,515 | A | 5/1996 | Mayer |
| 5,591,899 | A | 1/1997 | Griesbeck |
| 6,013,026 | A | 1/2000 | Krauter et al. |
| 6,018,987 | A | 2/2000 | Mayer et al. |
| 6,347,545 | B1 | 2/2002 | Osborn et al. |
| 6,591,661 | B2 | 7/2003 | Davey |
| 6,598,463 | B2 | 7/2003 | Sharp et al. |
| 6,817,238 | B2 | 11/2004 | Go Boncan et al. |
| 6,857,307 | B2 | 2/2005 | Gebele et al. |
| 6,964,191 | B1 | 11/2005 | Tata |
| 6,964,197 | B2 | 11/2005 | Davis et al. |
| 7,059,175 | B2 | 6/2006 | Volfkovich et al. |
| 7,624,622 | B1 | 12/2009 | Mayer et al. |
| 2004/0040372 | A1 | 3/2004 | Plester et al. |
| 2005/0118365 | A1 | 6/2005 | Miyazaki et al. |
| 2005/0211572 | A1 | 9/2005 | Buck et al. |
| 2006/0032293 | A1* | 2/2006 | Wild .............. G01N 33/14 |
| | | | 73/865.6 |
| 2007/0215046 | A1 | 9/2007 | Lupke et al. |
| 2009/0000355 | A1* | 1/2009 | Pernel .............. G01N 35/1011 |
| | | | 73/49.3 |
| 2009/0100909 | A1 | 4/2009 | Grosse Bley et al. |
| 2009/0277249 | A1 | 11/2009 | Polster et al. |
| 2009/0282900 | A1* | 11/2009 | Piombini .......... G01N 15/0826 |
| | | | 73/38 |
| 2010/0054998 | A1 | 3/2010 | Mayer et al. |
| 2010/0268488 | A1 | 10/2010 | Bismarck et al. |
| 2010/0274515 | A1 | 10/2010 | Hoss et al. |
| 2011/0056274 | A1 | 3/2011 | Bunod et al. |
| 2013/0025349 | A1 | 1/2013 | Soloman et al. |
| 2014/0021345 | A1 | 1/2014 | Maucec et al. |

FOREIGN PATENT DOCUMENTS

| | | | | |
|---|---|---|---|---|
| CN | 111458274 | A | * 7/2020 | ............. G01N 13/04 |
| CN | 110658120 | B | * 4/2021 | ......... G01N 15/0806 |
| DE | 10304996 | A1 | 9/2003 | |
| EP | 1792157 | B1 | 7/2010 | |
| EP | 2781905 | A1 | 9/2014 | |
| FR | 2308100 | A1 | 11/1976 | |
| GB | 1519499 | A | 7/1978 | |
| JP | H10267826 | A | 10/1998 | |
| JP | 2002310843 | A | 10/2002 | |
| JP | 2004279281 | A | 10/2004 | |
| JP | 6094838 | B2 | 3/2017 | |
| WO | 0148452 | A2 | 7/2001 | |
| WO | 2002088657 | A2 | 11/2002 | |
| WO | 2003060485 | A1 | 7/2003 | |
| WO | 2005052555 | A1 | 6/2005 | |
| WO | 2006032591 | A1 | 3/2006 | |
| WO | 2007077335 | A1 | 7/2007 | |

* cited by examiner

CAPTURE VESSEL CARTRIDGE FOR PERMEATION TESTING OF PREFILLED PACKAGES AND CONTAINERS

BACKGROUND

Instruments for analyzing permeation of films are well known. An industry leader in the development and commercialization of such instruments is AMETEK MOCON of Minnesota, United States. AMETEK MOCON offerings include OTR oxygen permeation analyzers, WVTR water vapor permeation analyzers, and CO2TR carbon dioxide permeation analyzers. Such analyzers are disclosed and described in U.S. Pat. Nos. 7,578,208, 7,993,587, 8,117,899, 8,388,742, and 10,488,318, the disclosures of which are hereby incorporated in their entirety by reference.

Sometimes it is desired to analyze the permeation of a prefilled package or container, such as a carbonated beverage bottle, a pre-filled medical syringe, etc. The commercially available instruments referenced above designed to analyze permeation of films are not adapted to analyzing permeation of prefilled packages or containers. Specialized instruments are available, but it is generally cost prohibitive to purchase and use an entirely separate instrument capable of only analyzing permeation through a prefilled package or container as the demand for such testing is significantly less than the demand for testing of films, and demand can be infrequent and sporadic.

Hence, a substantial need exists for a retrofit cartridge capable of achieving highly sensitive and accurate permeation testing of prefilled packages and containers using a commercially available instrument designed for analyzing permeation of films.

DETAILED DESCRIPTION OF THE INVENTION

| Nomenclature Table | |
|---|---|
| REF. NO. | DESCRIPTION |
| 10 | Cartridge |
| 20 | Vessel |
| 20a | Axis of Vessel |
| 21 | First Axial End of Vessel |
| 22 | Second Axial End of Vessel |
| 23 | Ferrule at Each Axial End of Vessel |

-continued

| Nomenclature Table | |
|---|---|
| REF. NO. | DESCRIPTION |
| 23¹ | Beveled Peripheral Edge of First Ferrule |
| 23² | Beveled Peripheral Edge of Second Ferrule |
| 28 | Circumferential Gasket Retention Channel in Axial End of Vessel |
| 29 | Void Volume of Vessel |
| 31 | First Endcap |
| 32 | Second Endcap |
| 33¹ | Beveled Peripheral Edge of First Endcap |
| 33² | Beveled Peripheral Edge of Second Endcap |
| 38 | Circumferential Gasket Retention Channel in Endcap |
| 41 | First Clamp |
| 42 | Second Clamp |
| 43 | Threaded Tightening Knob on Clamp |
| 47 | Clamp Pivot Axis |
| 51 | First Gasket |
| 52 | Second Gasket |
| 68 | Entrance Port |
| 69 | Exit Port |
| 100 | Target Analyte Permeation Testing Instrument |
| 110 | Fluid Flow Line |
| 121 | Primary Fluid Flow Valve in Line |
| 122 | Three Way Venting Valve in Line |
| 130 | Target Analyte Sensor |
| 140 | Controller |
| 150 | User Interface |
| 200 | Fluid Flow Docking Block |
| 201 | Hollow Screws |
| 202 | Endcap Sealing Ring |
| 203 | Individual Port Sealing Rings |
| CG | Source of Target Analyte Free Carrier Gas |
| H | Headspace |
| P | Filled Package or Container |

Construction

Figure 7:
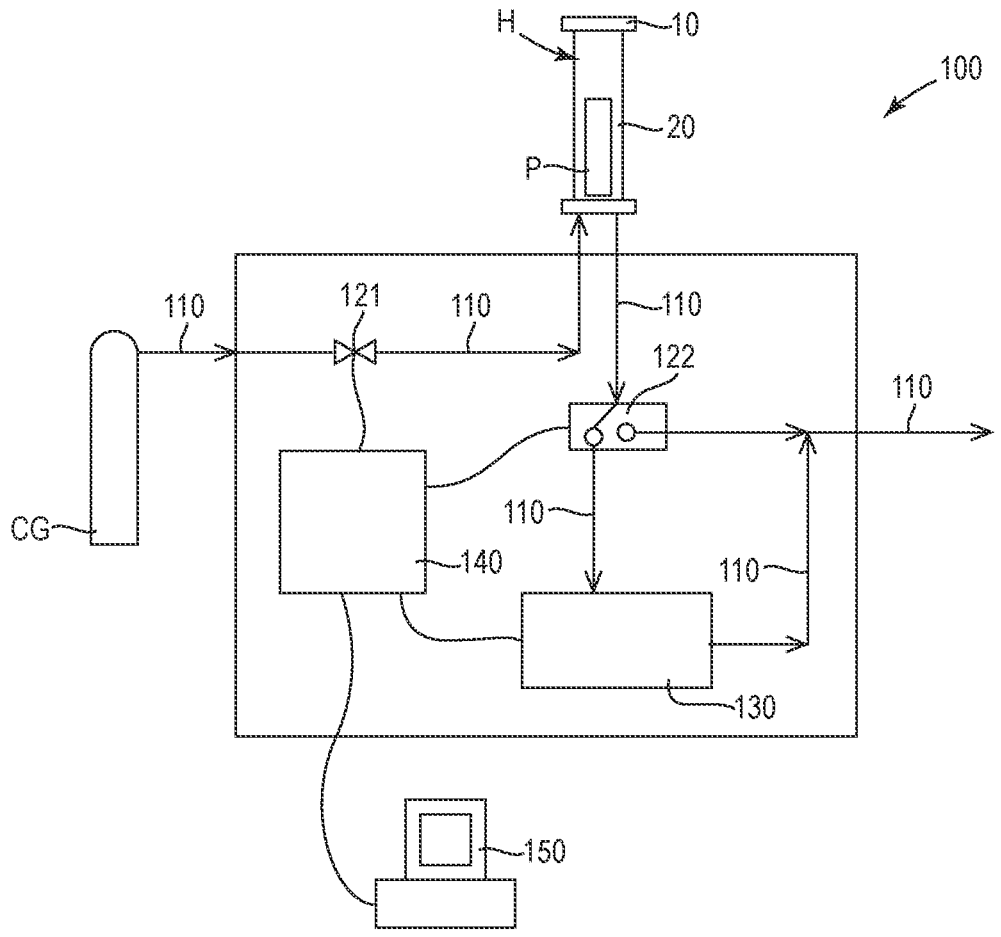
FIG. 7 is a schematic depiction of the invention depicted in FIGS. 1-6 connected to a permeation testing instrument for analyzing the transmission rate of a target analyte through a filled container.

Referring to FIG. 7, the invention is a cartridge 10 for use in conjunction with a target analyte permeation testing instrument 100 for measuring transmission rate of a target analyte through a prefilled package or container P.

Referring to FIGS. 1-6, the cartridge 10 includes a vessel 20 defining an axial axis 20a, and a pair of endcaps 31 and 32. The vessel 20 defines a void volume 29 with open axial ends 21 and 22. The vessel 20 and endcaps 31 and 32 are preferably metal, such as stainless steel, to minimize interference with target analyte measurements as a result of absorption, adsorption and/or outgassing of target analyte linked to the use of many other typical structural materials including plastics. The endcaps 31 and 32 engage and close a respective axial end 21 and 22 of the vessel 20 for sealing the open axial ends 21 and 22 of the vessel 20.

The void volume 29 should be closely matched to the volume of the package or container P being tested so as to limit the quantity of headspace H left in the void volume 29. Excessive headspace H can dramatically slow the test period required for testing of each package or container P due to excessive dilution of any target analyte entering the headspace H through the package or container P, and the large amount of gas that needs to be passed through and sensed by the target analyte sensor 130. Insufficient headspace H can interfere with the flow of target analyte free carrier gas around the full exterior surface of the package or container P and thereby adversely impact accuracy of the test results. Headspace H of between about 5 in³ to 50 in³ is generally preferred with a headspace H of between about 5 in³ to 20 in³ most preferred, in the absence of any contact between the package or container P and the sidewall(s) (unnumbered) of the vessel 20. A void volume 29 of between 20 in³ and 600 in³ is generally satisfactory of the vast majority of package or container P in need of permeation testing.

In many instances where packages or containers P of different sizes are to be tested using the same instrument 100, it is desirable to have a plurality of cartridges 10 available, each having a different void volume 29 so as to allowing testing of each of the differently sized package or container P with an appropriately sized headspace H. For example, a kit including three cartridges 10, each of which differs from the others by at least 100 in³ would generally be useful.

At least one of the endcaps 31 need be capable of repeated sealed engagement over its respective axial end 21 of the vessel 20 so as to be repositionable as between a closed position sealing off the void volume 29 and an open position providing access to the void volume 29. Preferably both endcaps 31 and 32 are operable for repeated sealed engagement over their respective axial end 21 and 22 of the vessel 20.

Referring to FIGS. 1-4, in a preferred embodiment the vessel 20 is a cylinder, with releasable sealed engagement of the endcaps 31 and 32 over their respective axial ends 21 and 22 of the vessel 20 achieved via first and second sanitary hinge clamps 41 and 42, such as those depicted in the Figures having two semi-circular legs pivotable about a single pivot axis 47 and circumferentially tightenable by a threaded tightening knob 43. The sanitary hinge clamps 41 and 42 each engage and axially compress together a ferrule 23 at each axial end 21 and 22 of the vessel 20 and a corresponding endcap 31 and 32. Axial compression of the endcaps 31 and 32 onto the respective axial ends 21 and 22 of the vessel 20 can be achieved by providing axially outward facing paired circumferentially beveled edges 231 and 232 and 331 and 332 on each combination of a ferrule 23 and an endcap 31 and 32, respectively. The ferrules 23 are preferably unitarily formed as a single piece with the balance of the vessel 20.

Figure 1:
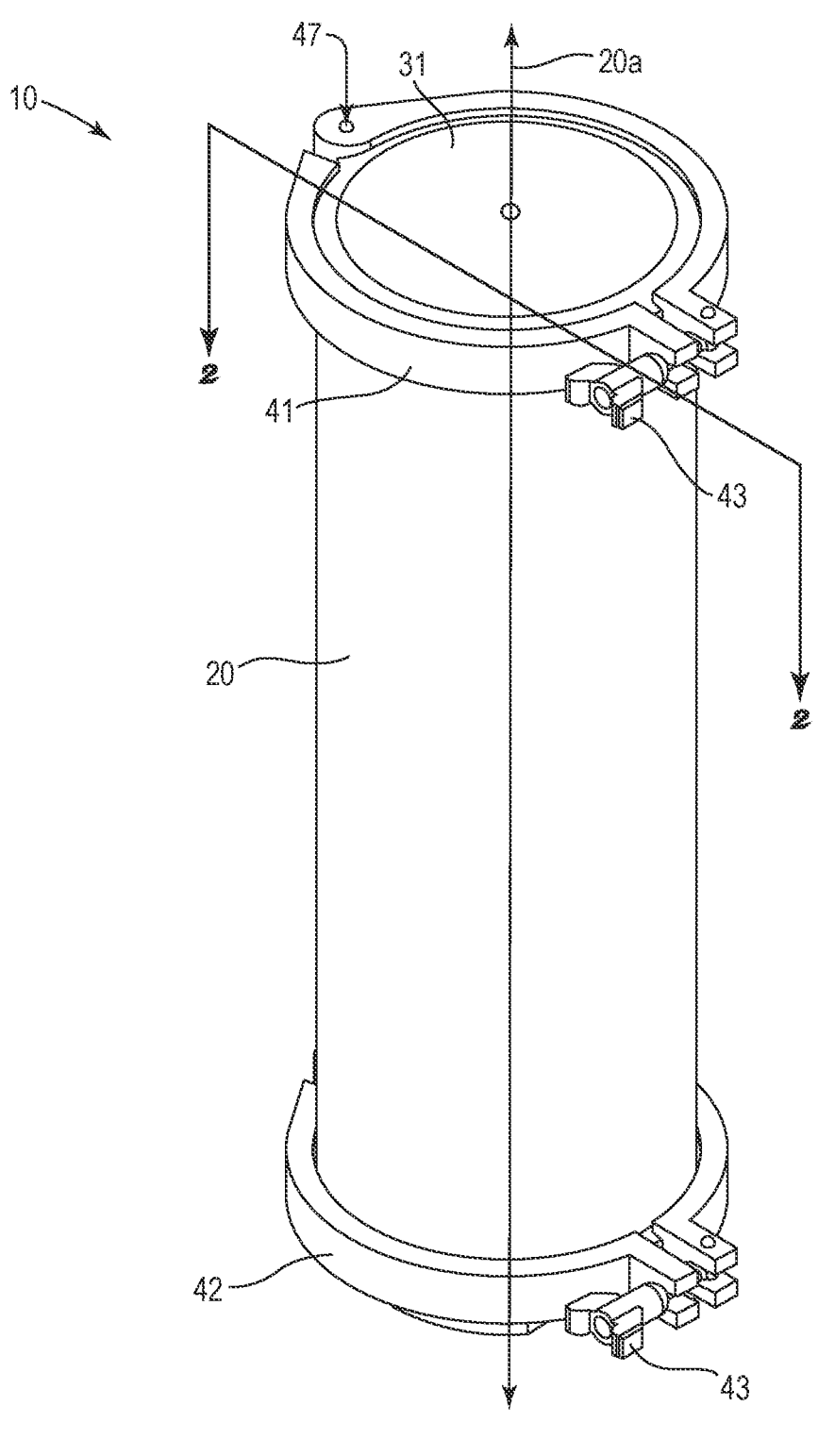
FIG. 1 is an upper perspective view of one embodiment of the invention.
Figure 2:
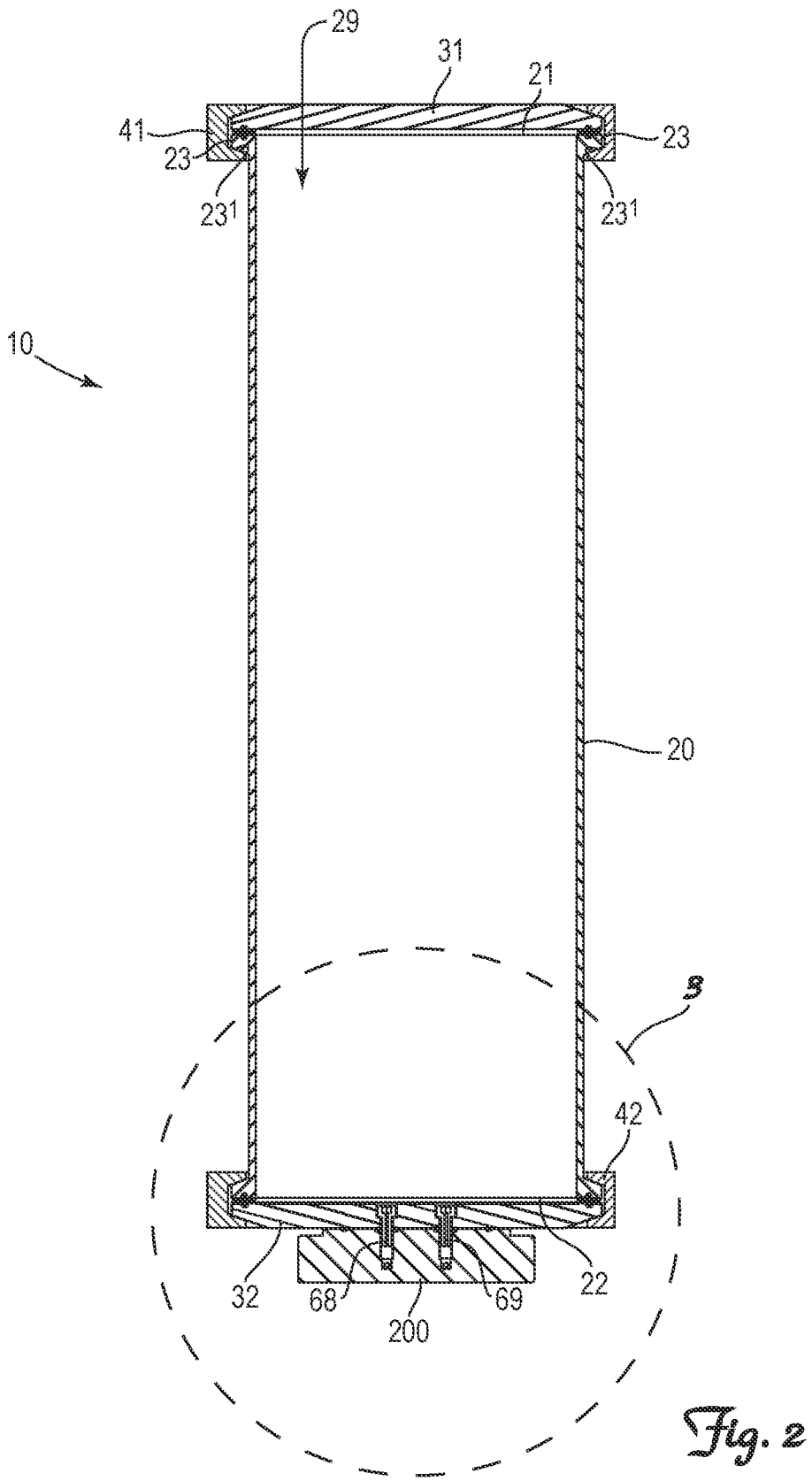
FIG. 2 is a cross-sectional view of the invention depicted in FIG. 1 taken along line 2-2.
Figure 3:
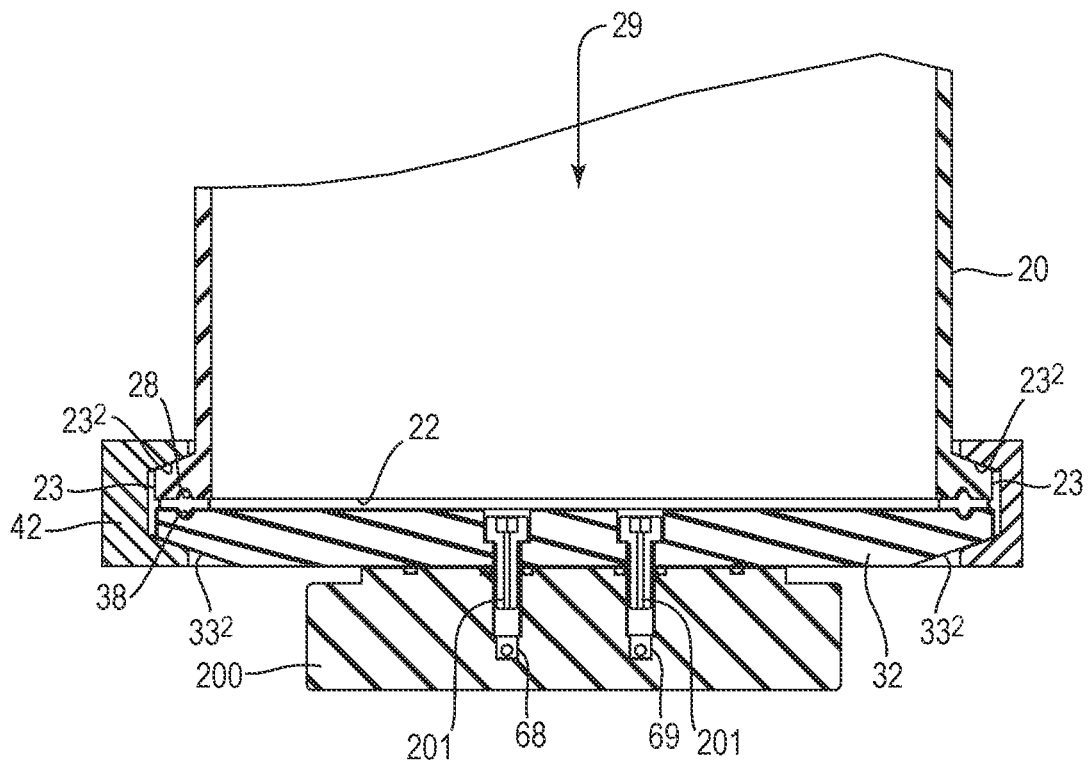
FIG. 3 is an enlarged view of the bottom portion of the invention depicted in FIG. 2, encircled by line 3.
Figure 4:
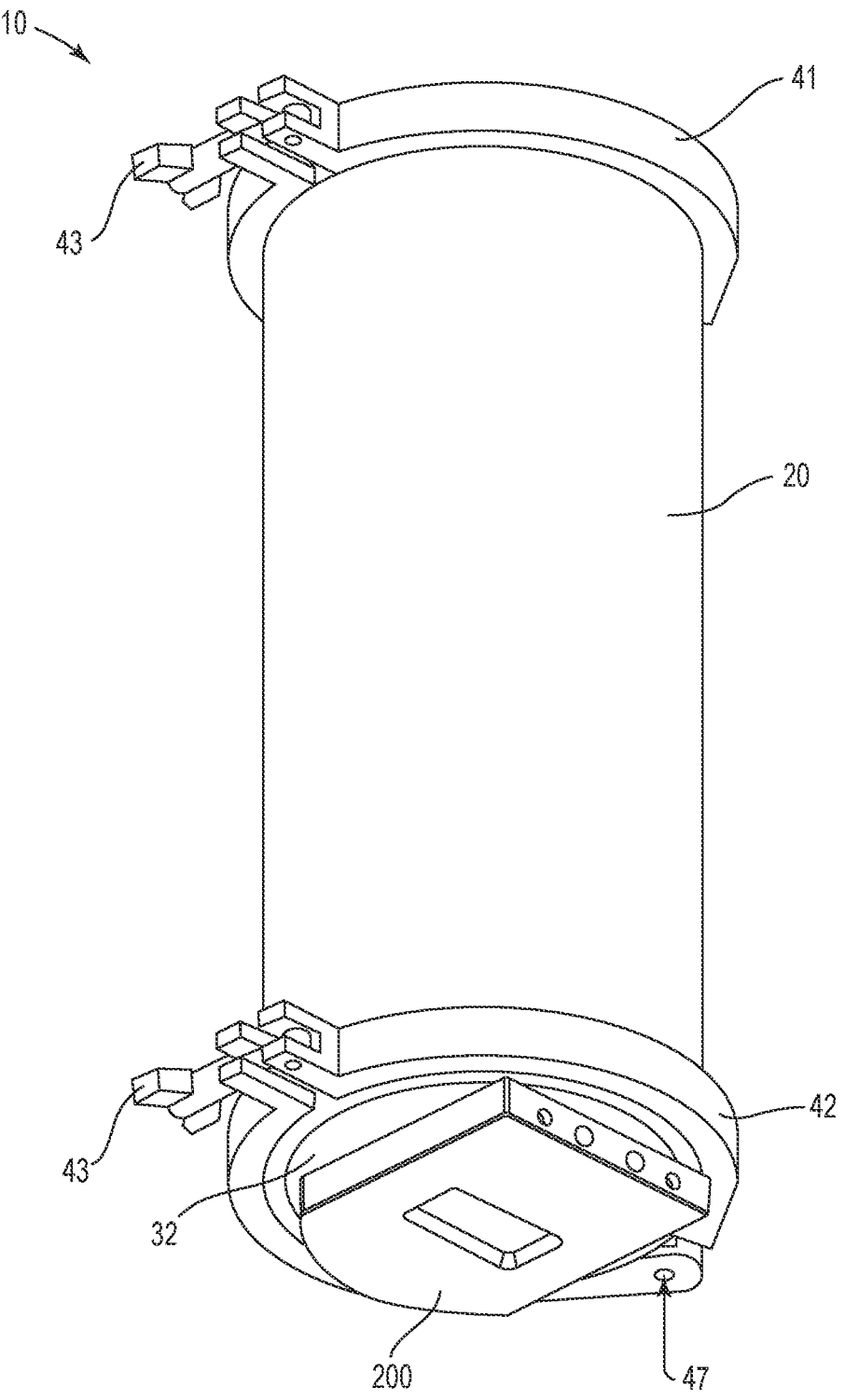
FIG. 4 is a lower perspective view of the invention depicted in FIG. 1.

Scaling gaskets 51 and 52 can be provided between each axial end 21 and 22 of the vessel 20 and the associated endcap 31 and 32, respectively. Referring to FIG. 3, circumferential channels 28 and 38 can be provided in each axial end 21 and 22 of the vessel 20 and in each endcap 31 and 32 respectively, for securing retention of the respective gasket 51 and 52 in the proper position and orientation at the interface between the axial ends 21 and 22 of the vessel 20 and the endcaps 31 and 32. To limit contamination of the void volume 29 by permeation through the endcaps 31 and 32, the sealing gaskets 51 and 52 are preferably made of polytetrafluoroethylene (PTFE) when measuring WVTR and nylon when measuring OTR or CO2TR.

Referring to FIGS. 2, 3, 6 and 7, entrance 68 and exit 69 ports are configured and arranged on the cartridge 10, preferably through the second endcap 32, for placing the void volume 29 of the vessel 20 in fluid communication with the flow line 110 of the target analyte permeation testing instrument 100. The entrance port 68 is placed in fluid communication with a source of target analyte free carrier gas CG, while the exit port 69 is selectively placed in fluid communication with either atmosphere during flushing of the void volume 29 or the target analyte sensor 130 of the target analyte permeation testing instrument 100 during periods of sensing.

Referring to FIG. 7, the cartridge 10 is used in conjunction with a target analyte permeation testing instrument 100 for measuring transmission rate of a target analyte through a prefilled package or container P. In general terms, the target analyte permeation testing instrument 100 includes fluid flow lines 110 which upon opening of a primary valve 121 direct a desired flow rate of target analyte free carrier gas from a source of the gas CG through the void volume 29 of the vessel 20 on the cartridge 10 and then selectively via valve 122 to atmosphere or target analyte sensor 130. The instrument 100 includes a controller 140 and a user interface 150 for setting and controlling flow of target analyte free carrier gas, setting and controlling sensing parameters for sensing of target analyte carried by the carrier gas from the void volume 29 of the vessel 20 on the cartridge 10 to the target analyte sensor 130, and recording and reporting sensed target analyte and calculated target analyte transmission rate values.

Figures 5, 6:
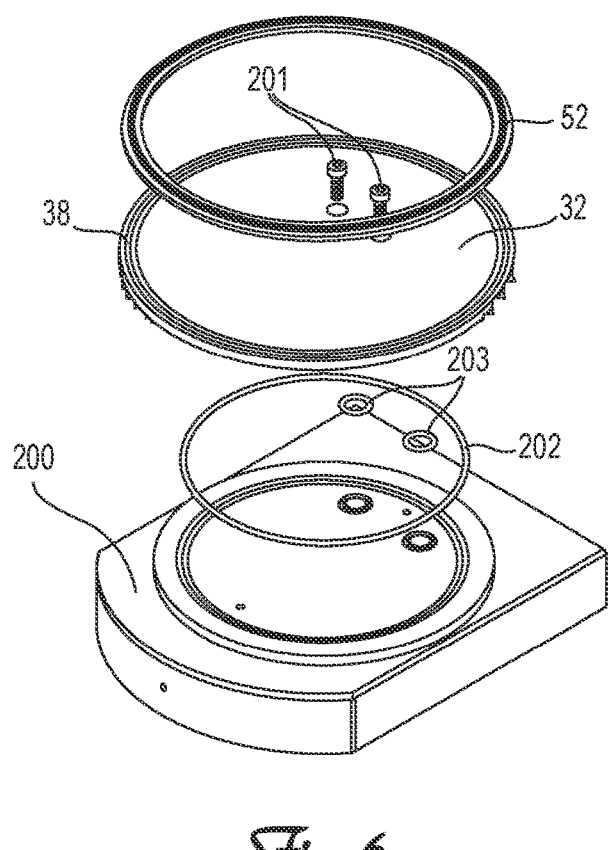
FIG. 5 is an exploded view of the top portion of the invention depicted in FIG. 4 sans clamp.
FIG. 6 is an exploded view of the bottom components of the invention depicted in FIG. 4 sans clamp.

Referring to FIG. 6, the cartridge 10 can be equipped with a docking block 200 to simplify connection of the cartridge 10 to the instrument 100 in a manner that provides the necessary and appropriate fluid communications with the lines 110 of the instrument 100. In one embodiment, hollow screws 201 pass through inlet and outlet orifices (unnumbered) in the second endcap 32 and threadably engage inlet and outlet orifices (unnumbered) in the docking block 200. The bore through the hollow screws 201 form the entrance and exit ports 68 and 69 respectively into and out from the void volume 29 of the cartridge 10. An endcap sealing ring 202 and individual port sealing rings 203 can be provided between the second endcap 32 and the docking block 200 to prevent atmospheric contamination of carrier gas flowing through the system.

Method of Measuring Transmission Rate

Referring to FIG. 7, the cartridge 10 can be used in combination with a target analyte permeation testing instrument 100 to measure the transmission rate of a target analyte, such as oxygen, carbon dioxide or water vapor, through a sealed package or container P filled with a product containing target analyte. Generally, testing involves the steps of:

(a) placing the sealed package or container P into the void volume 29 of the vessel 20 through one axial end 21 of the vessel 20 to establish a headspace H within the void volume 29, (b) closing and sealing the first end cap 31 onto the vessel 20 over the one axial end 21 of the vessel 20, (c) flushing target analyte from the headspace H with target analyte free carrier gas from a source of target analyte free carrier gas CG using the line 110 attached to the entrance and exit ports 68 and 69 on the cartridge 10 to form a flushed headspace H, (d) sensing and obtaining a measured value of target analyte carried by the target analyte free carrier gas flowing from the flushed headspace H through the line 110 to the target analyte sensor 130, and (e) calculating transmission rate of target analyte through the sealed package or container P using the measured value of target analyte sensed by the sensor 130.

We claim:

1. A cartridge for use in conjunction with a target analyte permeation testing instrument for measuring transmission rate of a target analyte through a prefilled package or container, wherein the target analyte permeation testing instrument includes a line carrying a target analyte free carrier gas from a source of the carrier gas to a target analyte sensor, characterized in that the cartridge comprises:

(a) a metal cylindrical vessel defining a void volume and having open axial ends with a ferrule at each axial end of the cylinder, (b) a first metal end cap capable of repeated sealed engagement over one of the open axial ends of the vessel when in a closed position, and unsealed disengagement from over the one open axial end of the vessel for providing access to the void volume of the vessel when in an open position, (c) a second metal end cap in sealed engagement over the other open axial end of the vessel, (d) an entrance port configured and arranged for connection with the line for providing fluid communication from the source of carrier gas to the void volume of the vessel, and (e) an exit port for connection with the line for providing fluid communication from the void volume of the vessel to the target analyte sensor, and (f) a first sanitary clamp operable for releasably axially compressing the first end cap onto to the cylinder.

2. The cartridge of claim 1 wherein the cartridge further comprises a second sanitary clamp operable for releasably axially compressing the second end cap onto the cylinder.

3. A method for measuring transmission rate of a target analyte through a sealed container filled with a product containing target analyte using a cartridge in accordance with claim 2, comprising the steps of:

(a) placing the sealed container into the void volume of the vessel through one axial end of the vessel to form a headspace within the vessel, (b) closing and sealing the first end cap onto the vessel over the one axial end of the vessel, (c) flushing target analyte from the headspace with target analyte free carrier gas from the source of target analyte free carrier gas using the line attached to the entrance and exit ports on the cartridge to form a flushed headspace, (d) sensing and obtaining a measured value of target analyte carried by the target analyte free carrier gas flowing from the flushed headspace through the line to the sensor, and (e) calculating transmission rate of target analyte through the sealed container using the measured value of target analyte sensed by the sensor.

4. The cartridge of claim 1 wherein the first end cap is capable of repeated gasket sealed engagement over one of the open axial ends of the vessel, and the second end cap is in gasket sealed engagement over the other open axial end of the vessel.

5. A method for measuring transmission rate of a target analyte through a sealed container filled with a product containing target analyte using a cartridge in accordance with claim 4, comprising the steps of:

(a) placing the sealed container into the void volume of the vessel through one axial end of the vessel to form a headspace within the vessel, (b) closing and sealing the first end cap onto the vessel over the one axial end of the vessel, (c) flushing target analyte from the headspace with target analyte free carrier gas from the source of target analyte free carrier gas using the line attached to the entrance and exit ports on the cartridge to form a flushed headspace, (d) sensing and obtaining a measured value of target analyte carried by the target analyte free carrier gas flowing from the flushed headspace through the line to the sensor, and (e) calculating transmission rate of target analyte through the sealed container using the measured value of target analyte sensed by the sensor.

6. The cartridge of claim 1 wherein the cylinder defines a void volume of between 20 in$^3$ and 600 in$^3$.

7. A method for measuring transmission rate of a target analyte through a sealed container filled with a product containing target analyte using a cartridge in accordance with claim 6, comprising the steps of:

(a) placing the sealed container into the void volume of the vessel through one axial end of the vessel to form a headspace within the vessel, (b) closing and sealing the first end cap onto the vessel over the one axial end of the vessel, (c) flushing target analyte from the headspace with target analyte free carrier gas from the source of target analyte free carrier gas using the line attached to the entrance and exit ports on the cartridge to form a flushed headspace, (d) sensing and obtaining a measured value of target analyte carried by the target analyte free carrier gas flowing from the flushed headspace through the line to the sensor, and (e) calculating transmission rate of target analyte through the sealed container using the measured value of target analyte sensed by the sensor.

8. A kit for target analyte permeation testing of prefilled packages or containers comprising at least three cartridges in accordance with claim 1, each having different void volumes that differ by at least 100 in$^3$.

9. A method for measuring transmission rate of a target analyte through a sealed container filled with a product containing target analyte using a cartridge in accordance with claim 1, comprising the steps of:

(a) placing the sealed container into the void volume of the vessel through one axial end of the vessel to form a headspace within the vessel, (b) closing and sealing the first end cap onto the vessel over the one axial end of the vessel, (c) flushing target analyte from the headspace with target analyte free carrier gas from the source of target analyte free carrier gas using the line attached to the entrance and exit ports on the cartridge to form a flushed headspace, (d) sensing and obtaining a measured value of target analyte carried by the target analyte free carrier gas flowing from the flushed headspace through the line to the sensor, and (e) calculating transmission rate of target analyte through the sealed container using the measured value of target analyte sensed by the sensor.

\* \* \* \* \*